United States Patent
Katoh

(10) Patent No.: US 7,046,235 B2
(45) Date of Patent: May 16, 2006

(54) INPUT DEVICE AND TOUCH AREA REGISTRATION METHOD

(75) Inventor: Takehiro Katoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 10/442,451

(22) Filed: May 20, 2003

(65) Prior Publication Data

US 2003/0214488 A1    Nov. 20, 2003

(30) Foreign Application Priority Data

May 20, 2002    (JP)    ............................ P2002-145198

(51) Int. Cl.
  *G09G 5/00*    (2006.01)
(52) U.S. Cl. ...................................... 345/173; 345/174
(58) Field of Classification Search ........ 345/173–180; 382/115, 124, 125, 156, 173–177, 333, 334, 382/339

See application file for complete search history.

(56) References Cited

U.S. PATENT DOCUMENTS 5,748,184 A * 5/1998 Shieh ......................... 345/173

FOREIGN PATENT DOCUMENTS

JP         10-232735        9/1998

* cited by examiner

*Primary Examiner*—Dennis-Doon Chow
(74) *Attorney, Agent, or Firm*—David G. Conlin; John J. Penny, Jr.; Edwards Angell Palmer & Dodge LLP

(57) ABSTRACT

An input device includes a touch panel which recognizes a press on each touch area and outputs press information and a controller which receives the press information output from the touch panel and transmits corresponding data to a main apparatus. The controller registers pressed regions of the touch panel and regions surrounding the pressed regions as touch areas in a touch area registration process performed prior to execution of data input operation. Upon receiving particular press information, the controller switches the kind of data to be input by pressing the touch areas and annunciates switching of the kind of input data by producing an audible message.

9 Claims, 9 Drawing Sheets

3(2)

3(2)

INPUT DEVICE AND TOUCH AREA REGISTRATION METHOD

BACKGROUND OF THE INVENTION

1. Field of the Invention

The present invention relates to an input device provided with a touch panel for entry of information as well as to a method of registering touch areas.

2. Description of the Related Art

Today, facsimile machines and copying machines are often provided with a touch panel for entry of necessary information. The touch panel typically displays operating instructions and touch areas. As an operator presses specific touch areas according to the instructions, the touch panel switches its on-screen display to a different page showing appropriate touch areas and instructions. Since the touch panel allows the operator to perform every process of operation on its screen only, the operator usually finds the touch panel easy to understand and operate.

A conventional touch panel displays touch areas at fixed locations which are predefined so that the operator has to move the hand to the location of the desired touch area and press it with a finger in each step of operation. Thus, it is difficult for a person having a disabled hand to efficiently enter information by operating the touch panel.

Under this circumstance, Japanese Laid-open Patent Publication No. H10-232735 proposes an input device for information equipment that makes it possible to define an arrangement of keys (touch areas) on a touch panel in such a fashion that the arrangement is suited to individual users. According to the proposal of this Publication, a user presses the touch panel with all the fingers stretched and aligned side by side, with all the fingers stretched and spread out, and with all the fingers bent. Then, the input device determines a key arrangement best suited to the user from the positions of presses by the respective fingers and generates a virtual keyboard having the key arrangement suitable to the user on the touch panel.

According even to the aforementioned method of the prior art (Publication No. H10-232735), however, it is necessary for the user to move fingers and press the touch areas shown on the touch panel, and this makes the input device difficult to operate for those having difficulty in moving the fingers up to the touch areas assigned as explained above.

Also, if the user can not see indications on the touch panel, it would be impossible to recognize the touch area arrangement, and operation would become even more difficult in this case. For example, a person confined to a wheelchair occasionally can not well recognize and operate the touch areas if the touch panel is located relatively high. It is also difficult for a weak-sighted person to see indications on the touch panel and operate it.

SUMMARY OF THE INVENTION

It is an object of the invention to provide an input device which makes it possible to define, or register, touch areas with good operability even if an operator can not see a touch panel. It is another object of the invention to provide a touch area registration method for registering such touch areas on a touch panel.

According to the invention, an input device includes a touch panel which recognizes a press on a touch area and outputs press information, and a controller which receives the press information output from the touch panel and transmits corresponding data to a main apparatus, wherein the controller registers a pressed region of the touch panel and regions surrounding the pressed region as the touch area in a touch area registration process performed prior to execution of data input operation.

Since the touch areas on the conventional touch panel are preset at fixed locations of the panel, a person confined to a wheelchair occasionally can not well recognize and operate the touch areas if the touch panel is located relatively high. It is also difficult for a weak-sighted person to see indications on the touch panel and operate it.

In the input device of the invention, a user registers individual touch areas before performing input operations. To register the touch areas, the user places the hand at a desired position on the touch panel and presses it with all the fingers, for example. As a result, regions of the touch panel pressed by the individual fingertips and their surrounding regions are registered as the touch areas.

Since the touch areas are generated at locations convenient for the specific user in this fashion, the input device of the invention enables the user to press the touch areas without moving the hand or fingers to the locations of the individual touch areas unlike the conventional touch panel.

This enables the user to operate the touch panel without seeing its touch area arrangement. Accordingly, even a person confined to a wheelchair who can not see the touch panel and has to operate it from a low position or a weak-sighted person who can not visually recognize the touch areas can easily press the touch areas on the touch panel. In addition, even a person having difficulty in moving the hand can easily operate the touch panel as it is not necessary to move the hand.

According to the invention, a touch area registration method includes the steps of receiving press information output from a touch panel, transmitting data corresponding to the received press information, and registering a pressed region of the touch panel and regions surrounding the pressed region as the touch area prior to execution of data input operation.

In this touch area registration method of the invention, a user registers individual touch areas before performing input operations. To register the touch areas, the user places the hand at a desired position on the touch panel and presses it with all the fingers, for example. As a result, regions of the touch panel pressed by the individual fingertips and their surrounding regions are registered as the touch areas. Since the touch areas are generated at locations convenient for the specific user in this fashion, the input device enables the user to press the touch areas without moving the hand or fingers to the locations of the individual touch areas unlike the conventional touch panel.

This enables the user to operate the touch panel without seeing its touch area arrangement. Accordingly, even a person confined to a wheelchair who can not see the touch panel and has to operate it from a low position or a weak-sighted person who can not visually recognize the touch areas can easily press the touch areas on the touch panel. In addition, even a person having difficulty in moving the hand can easily operate the touch panel as it is not necessary to move the hand.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

An input device 1 and a touch area registration method of the invention are now described with reference to a specific embodiment thereof.

Figure 1A:
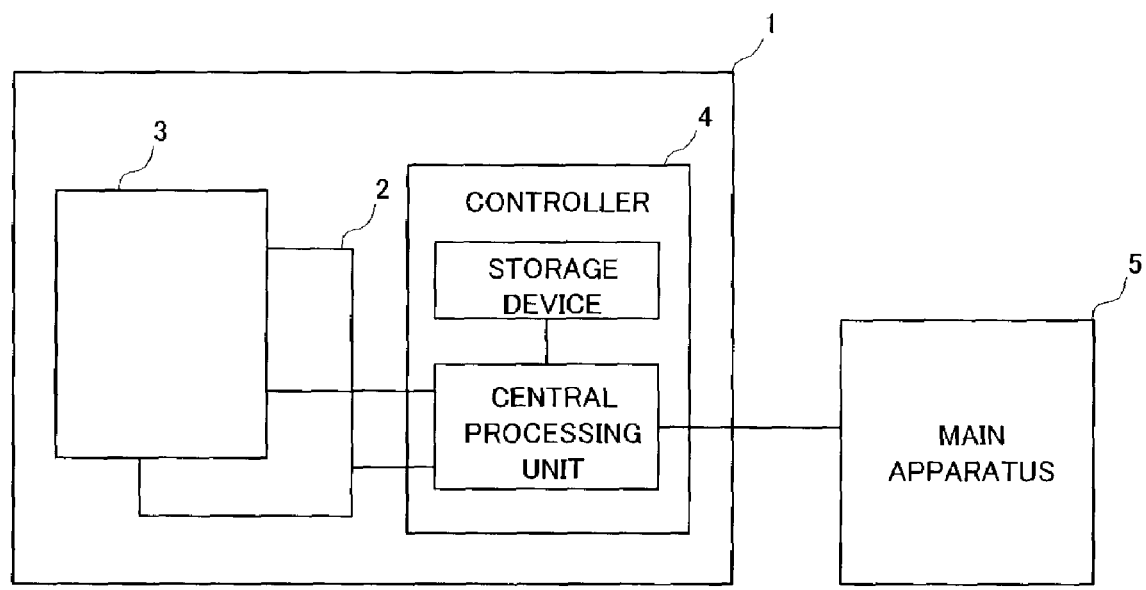
FIG. 1A is a block diagram of an input device according to a preferred embodiment of the invention.
Figure 1B:
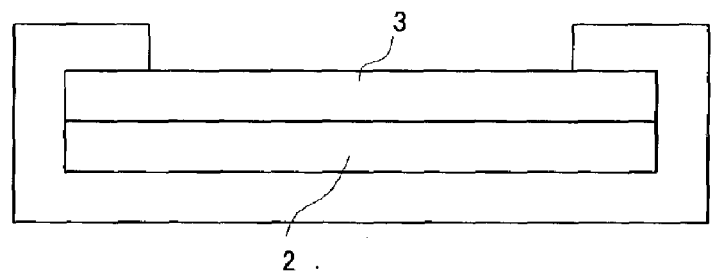
FIG. 1B is a sectional side view of a display unit and a touch panel of the input device of FIG. 1A.

As shown in FIGS. 1A and 1B, the input device 1 includes a display unit 2, a touch panel 3 and a controller 4. The input device 1 is constructed in such a manner that it allows registration of touch areas prior to input operation and transmits commands entered by a user by pressing display screen to a main apparatus 5 (an image forming apparatus, such as a printer, a copying machine or a facsimile machine). The touch panel 3 is flat-shaped and has multiple touch areas. The touch panel 3 thus constructed is overlaid on a display surface of the display unit 2 having a flat matrix configuration. When any of the touch areas is pressed, the touch panel 3 transmits press information including the corresponding position of press and pressing force to the controller 4.

The touch areas can be generated at easy-to-press locations selected by the user. The display unit 2 shows touch area locations on the touch panel 3 together with functions assigned to the individual touch areas to assist the user in understanding touch panel operation. The controller 4 includes a central processing unit (CPU) and a storage device, such as a read-only memory (ROM) or a random-access memory (RAM). The controller 4 is connected to the display unit 2 to control its display actions. Also connected to the touch panel 3, the controller 4 receives the press information and outputs corresponding data to the main apparatus 5.

Figure 2:
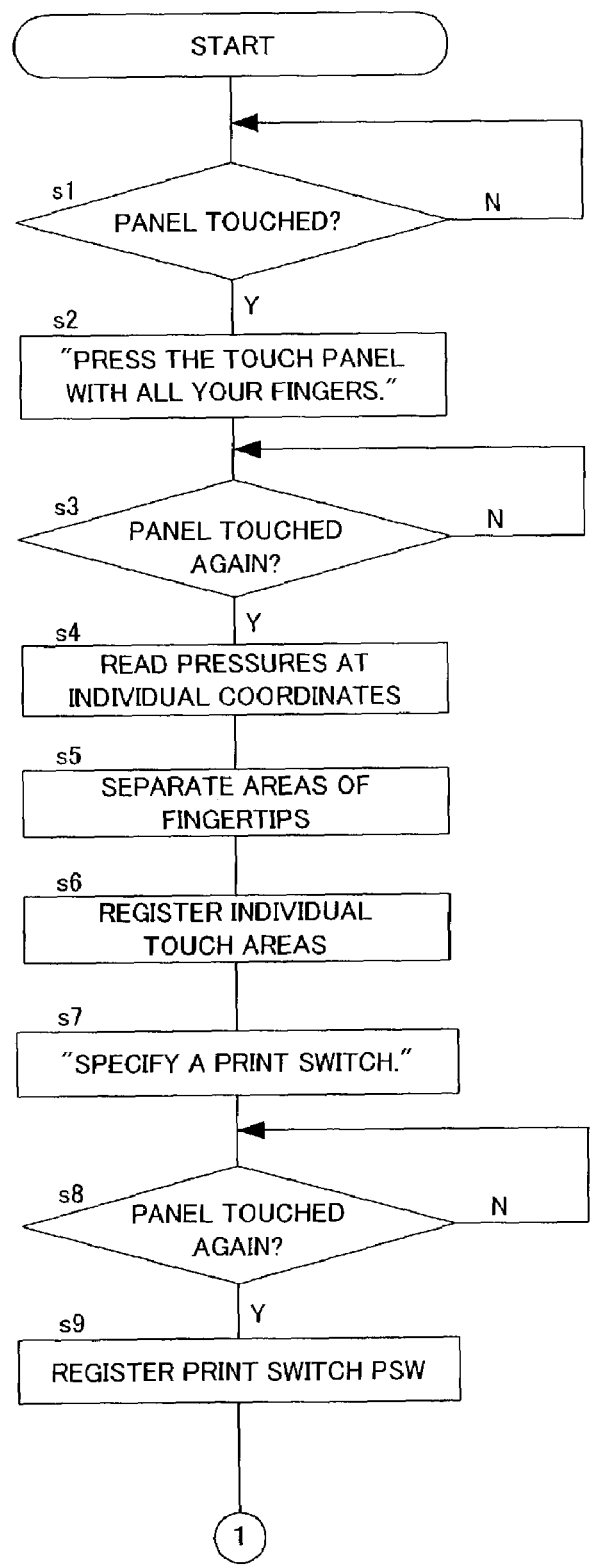
FIG. 2 is part of a flowchart showing operation of the input device.
Figure 3:
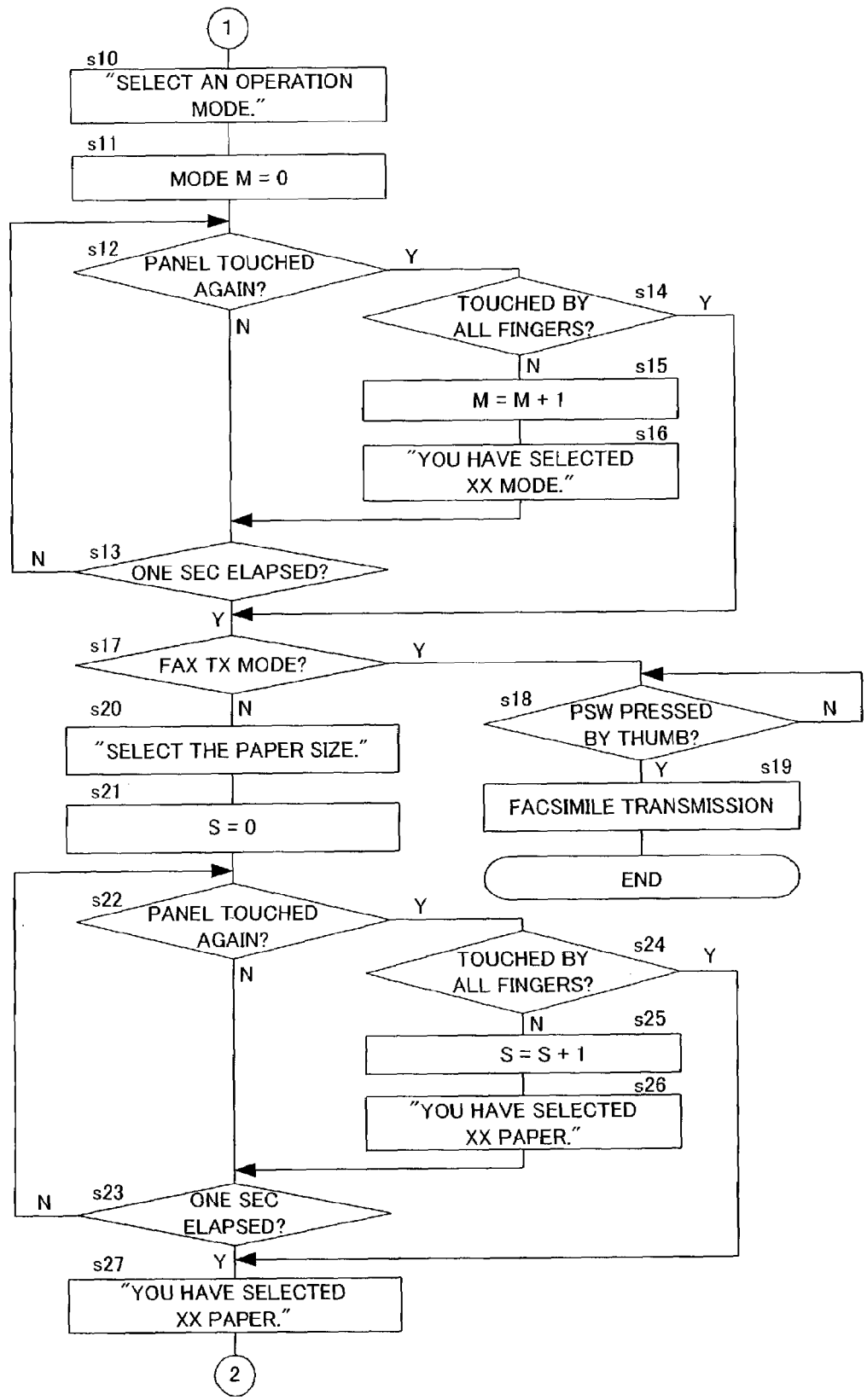
FIG. 3 is part of the flowchart that follows FIG. 2.
Figure 4:
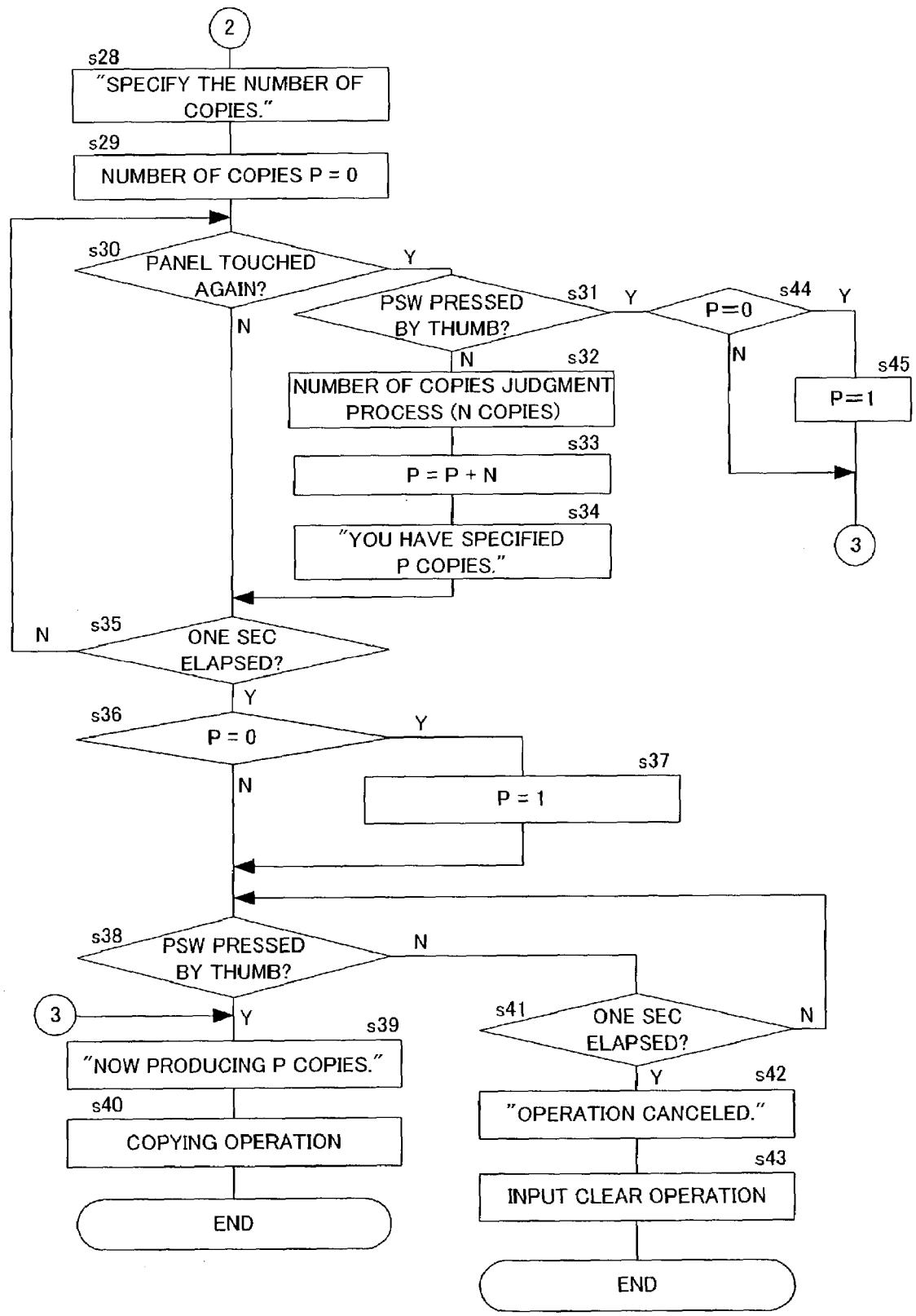
FIG. 4 is part of the flowchart that follows FIG. 3.

Next, operation of the input device 1 is explained referring to flowcharts shown in FIGS. 2 to 4. Assuming that the main apparatus 5 is a copying machine having a facsimile function, the following description includes an explanation of how the number of pages and paper size are set.

If the user touches the touch panel 3 by hand when the controller 4 is in a standby condition, the controller 4 detects a touch and begins a process of registering touch areas in step S1. In step S2, the controller 4 annunciates the message "Press the touch panel with all your fingers." If the user presses the touch panel 3 with all the fingers in response to the message, the controller 4 detects that the touch panel 3 has been touched again in step S3 and reads in data on pressures applied at individual coordinates in step S4. In step S5, the controller 4 separates data on areas pressed by individual fingertips from the pressure and coordinate data, and in step S6, the controller 4 registers the individual touch areas. A method of registering the touch areas will be explained later in greater detail. In the explanation of flowcharts to follow in this Specification, every audible guidance message will be enclosed in quotation marks (" ").

Upon completion of registration of the touch areas, the controller 4 proceeds to a process of registering a print switch. In step S7, the controller 4 annunciates the message "Specify a print switch." If the user strongly presses the touch panel 3 with the thumb, for instance, in response to the message, the controller 4 detects a press in step S8 and registers the press by the thumb as the print switch (PSW) in step S9.

Proceeding next to a setting data entry process, the controller 4 prompts the user to first select an operation mode by annunciating in step S10 the message "Select an operation mode." The user is offered a choice of single-sided copying mode, double-sided copying mode or facsimile transmission mode. The operation mode preselected by default (M=0) is the single-sided copying mode (step S11). If the touch panel 3 is not touched for one second (steps S12, S13), the currently selected single-sided copying mode remains unchanged. Also if a touch on the touch panel 3 is detected within one second in step S12 and it is judged to be a touch by all the fingers in step S14, the single-sided copying mode selected by default remains unchanged.

If the touch on the touch panel 3 made within one second after the message of step S10 is not judged to be a touch by all the fingers in step S14, the controller 4 switches the operation mode by incrementing the value of mode (M=M+1) in step S15. Here, the value is M=1 which specifies the single-sided copying mode. Then, in step S16, the controller 4 annunciates the message "You have selected single-sided copying mode." If the touch panel 3 is not touched for one second (step S13), the single-sided copying mode thus selected remains unchanged. If a touch on the touch panel 3 is detected in step S12 within one second after the message of step S16 and it is judged to be a touch by all the fingers in step S14, the selection of the single-sided copying mode (M=1) is made valid.

If the touch on the touch panel 3 is not a touch by all the fingers in step S14, the controller 4 switches the operation mode by incrementing the value of mode (M=M+1) in step S15. Here, the value is M=2 which specifies the double-sided copying mode. If the touch panel 3 is touched again within one second by other than all the fingers, the controller 4 switches the operation mode to the facsimile transmission mode.

In step S17, the controller 4 judges whether the selected operation mode is the facsimile transmission mode. If the facsimile transmission mode is currently selected, the controller 4 waits for a press on the aforementioned print switch (PSW) by the thumb in step S18. If the print switch (PSW) is pressed by the thumb in step S18, the controller 4 causes the main apparatus 5 to transmit a facsimile message in step S19. If the print switch (PSW) is not pressed by the thumb in step S18, the controller 4 further waits for a press on the print switch (PSW) by the thumb.

If the selected operation mode is judged to be not the facsimile transmission mode but the single-sided or double-sided copying mode in step S17, the controller 4 prompts the user to select the paper size by annunciating in step S20 the message "Select the paper size." The paper size is selected in a similar fashion to the selection of the operation mode.

The paper size preselected by default (S=0) is the A4 size (step S21). If the touch panel 3 is not touched for one second (steps S22, S23), the currently selected paper size remains unchanged. Also if a touch on the touch panel 3 is detected within one second in step S22 and it is judged to be a touch by all the fingers in step S24, the paper size selected by default remains unchanged.

When a touch on the touch panel 3 by other than all the fingers is detected within one second (steps S22, S24), the controller 4 changes the paper size by incrementing the paper size value (S=S+1) in step S25. Here, the paper size value is S=1 which specifies the B5 size. Then, in step S26, the controller 4 annunciates the message "You have selected B5 paper." If the touch panel 3 is not touched for one second (step S23), the B5 size thus selected remains unchanged. If a touch on the touch panel 3 is detected in step S22 within one second after the message of step S26 and it is judged to be a touch by all the fingers in step S24, the selection of the B5 size (S=1) is made valid.

If the touch on the touch panel 3 is not a touch by all the fingers in step S24, the controller 4 changes the paper size by incrementing the paper size value (S=S+1) in step S25. Here, the paper size value is S=2 which specifies the A4 size. Each time the touch panel 3 is touched again by other than all the fingers, the controller 4 changes the paper size to B4, A3 and manual feed paper size in this order. Upon completion of paper size selection, the controller 4 notifies the user of the currently selected paper size by annunciating in step S27 the message "You have selected XX paper."

Next, the controller 4 prompts the user to specify the number of copies by annunciating in step S28 the message "Specify the number of copies."

The number of copies preselected by default (P=0) is zero (step S29). If the touch panel 3 is not touched for one second (steps S30, S35), the controller 4 proceeds to step S36 in which the controller 4 detects that the currently set number of copies is zero (P=0). Then, proceeding to step S37, the controller 4 sets the number of copies to 1 (P=1).

If the user presses the print switch (PSW) by the thumb alone within one second after the message of step S28 (steps S30, S31) and the currently set number of copies is zero (P=0) in step S44, the controller 4 sets the number of copies to 1 (P=1) in step S45. Then, after annunciating the message "Now producing one copy" in step S39, the controller 4 causes the main apparatus 5 to perform a copying operation in step S40.

If the user touches the touch panel 3 by other than a press on the print switch (PSW) by the thumb alone within one second after the message of step S28 (steps S30, S31), the controller 4 performs a number of copies judgment process to judge the number of copies in step S32, in which the user enters the number of copies N, e.g., 10 copies, to be produced. A method of entering the number of copies N will be explained later in detail. The controller 4 sets the number of copies by performing the mathematical operation P=P+N (10 copies in our example) in step S33 and annunciates in step S34 the message "You have specified 10 copies." If one second elapses after the message of step S34 without any touch on the touch panel 3 in step S35, the number of copies thus specified is made valid.

If the user presses the print switch (PSW) by the thumb alone within one second after the message of step S34 (steps S30, S31), the controller 4 judges that the number of copies thus specified has been acknowledged. Then, after annunciating the message "Now producing 10 copies" in step S39, the controller 4 causes the main apparatus 5 to perform the copying operation in step S40.

If the user touches the touch panel 3 by other than a press on the print switch (PSW) by the thumb alone within one second after the message of step S34 (steps S30, S31), the controller 4 performs again the process of judging the number of copies in step S32, in which the user enters an additional number of copies N, e.g., 4 copies, to be produced. The controller 4 sets the number of copies by performing again the mathematical operation P=P+N (10 plus 4 copies in our example) in step S33 and annunciates in step S34 the message "You have specified 14 copies." If one second elapses after the message of step S34 without any touch on the touch panel 3 in step S35, the number of copies thus specified is made valid. Since P is not equal to zero at this point (step S36), the controller 4 proceeds to step S38. Then, if the user presses the print switch (PSW) by the thumb alone in step S38, the controller 4 annunciates the message "Now producing 14 copies" in step S39 and causes the main apparatus 5 to perform the copying operation in step S40.

If one second elapses in step S41 without any press on the print switch (PSW) in step S38, the controller 4 annunciates the message "Operation canceled" in step S42. Then, the controller 4 performs an input clear operation.

In the foregoing data input procedure, the user can cancel, or erase, data entered immediately before at any point in the procedure by sliding a finger in a horizontal direction while holding the finger pressed against the touch panel 3. When any input data is canceled in this fashion, the controller 4 terminates a current input job and returns to a point immediately before entry of the data. In addition, the user can perform "clear all" operation (erasure of all data already entered by the user) at any point in the data input procedure by sliding a finger in a vertical direction while holding the finger pressed against the touch panel 3.

Referring now to FIGS. 5 to 8, the method of registering the locations of the touch areas is described below.

Figure 6:
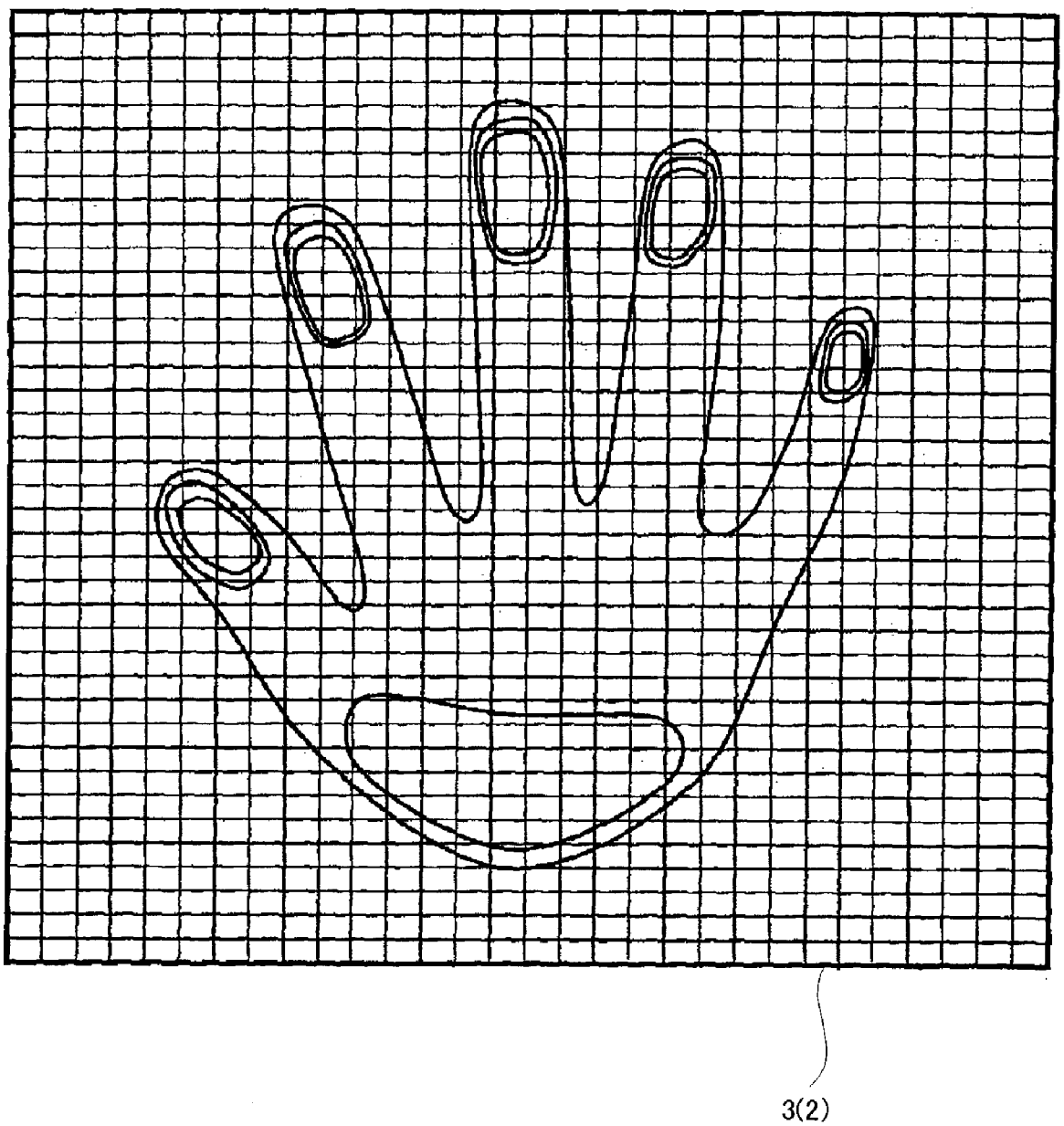
FIG. 6 is a diagram showing a status in which the touch panel is pressed by one hand.

First, the user presses the touch panel 3 overlaid on the display unit 2 having a flat matrix configuration by one hand as shown in FIG. 6. In this condition, the touch panel 3 is pressed by the entire area of the hand. In particular, great pressure (pressing force) is applied in areas of the fingertips and palm.

Figure 5:
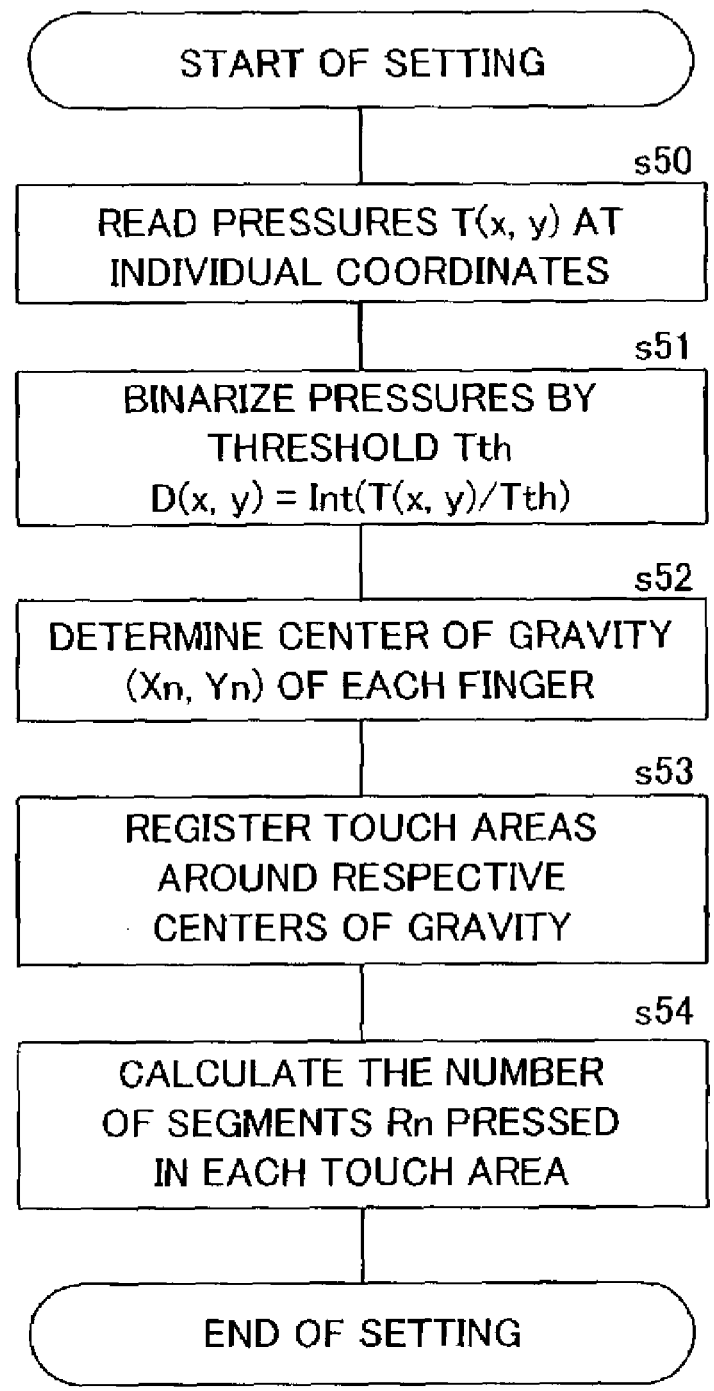
FIG. 5 is a flowchart showing a subroutine of the operation of the input device.

In step S50 of FIG. 5, the controller 4 reads in data on pressures $T(x, y)$ applied at individual coordinates $(x, y)$ of all pressure- or touch-sensitive segments of the touch panel 3 which are arranged in a matrix of rows and columns. Then, in step S51, the controller 4 binarizes the individual pressure data $T(x, y)$ by using a threshold Tth. More specifically, the pressure data $T(x, y)$ are binarized by using the equation $D(x, y)=Int(T(x, y)/Tth)$. Here, $D(x, y)=1$ if $T(x, y)>Tth$, and $D(x, y)=0$ if $T(x, y)<Tth$. As a result of this mathematical operation, the individual segments of the touch panel 3 are divided into segments where the pressure is applied and segments where no pressure is applied.

Figure 7:
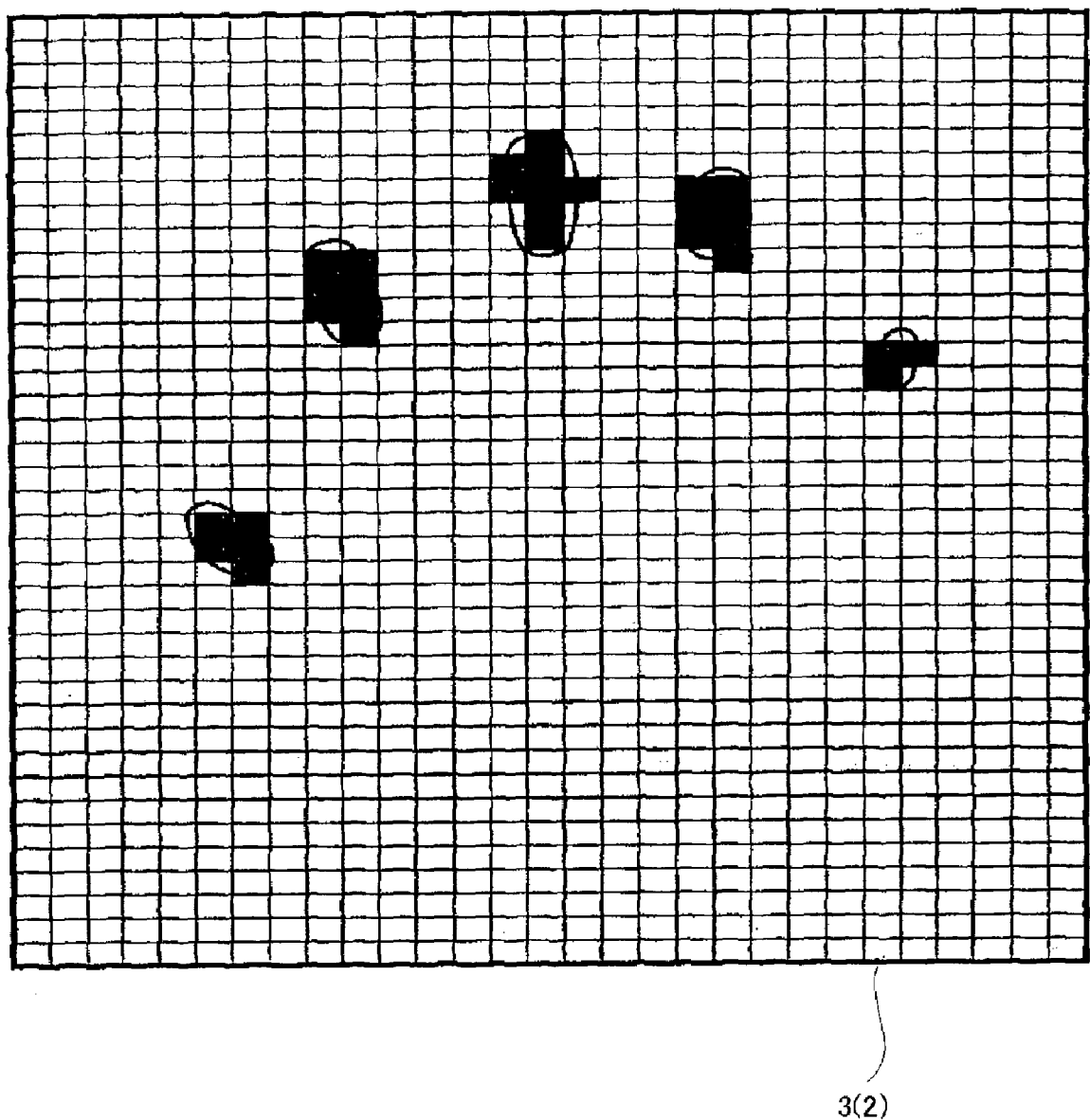
FIG. 7 is a diagram showing a status in which pressure is applied on the touch panel.

By taking out the segments where the pressure has been applied, i.e., $D(x, y)=1$, which are shown in gray in FIG. 7, regions pressed by the five fingertips are separated from other regions. Then, in step S52, the controller 4 determines the segment located at the center of gravity of the segments pressed by each of the five fingers by calculating the mean values of the coordinates $(x, y)$ of the segments where the pressure has been applied, i.e., $D(x, y)=1$. For the sake of explanation in the following context of this Specification, the thumb, the index finger, the middle finger, the third finger and the little finger are referred to as the 1st to 5th fingers, respectively, and the center of gravity of the nth finger is expressed by coordinates $(Xn, Yn)$, where $n=1, 2, \ldots 5$.

Figure 8:
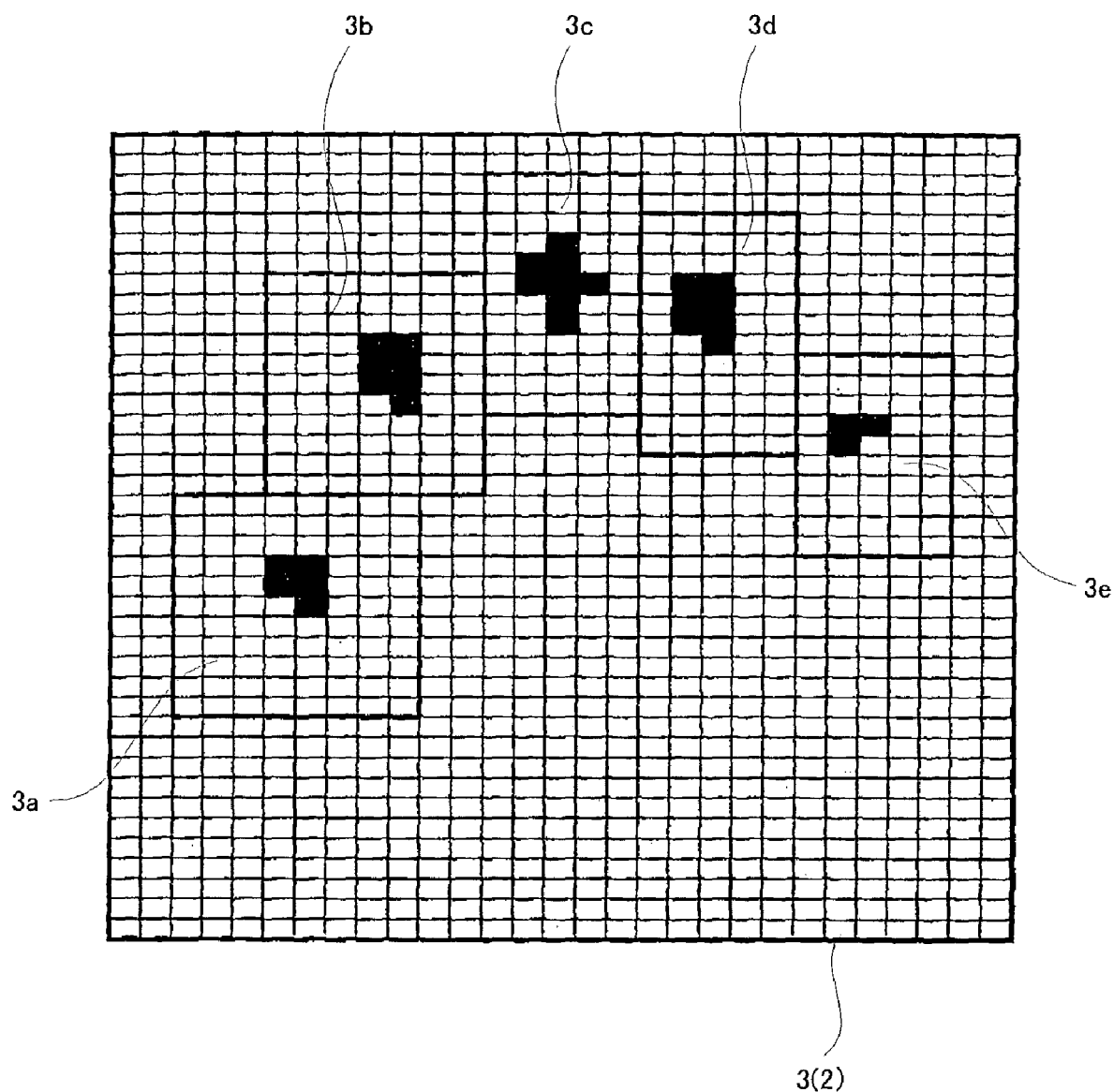
FIG. 8 is a diagram showing touch areas registered on the touch panel.

Then, in step S53, the controller 4 sets, or registers, rectangular touch areas 3a–3e for the five fingers as shown by thick solid lines in FIG. 8, each touch area containing the segment at the center of gravity and the segments surrounding that segment.

In step S54, the controller 4 calculates the number of segments where the pressure has been applied, i.e., D(x, y)=1, for each of the five touch areas 3a–3e. Here, the number of segments where the pressure has been applied by the nth finger is expressed by Rn.

Figure 9:
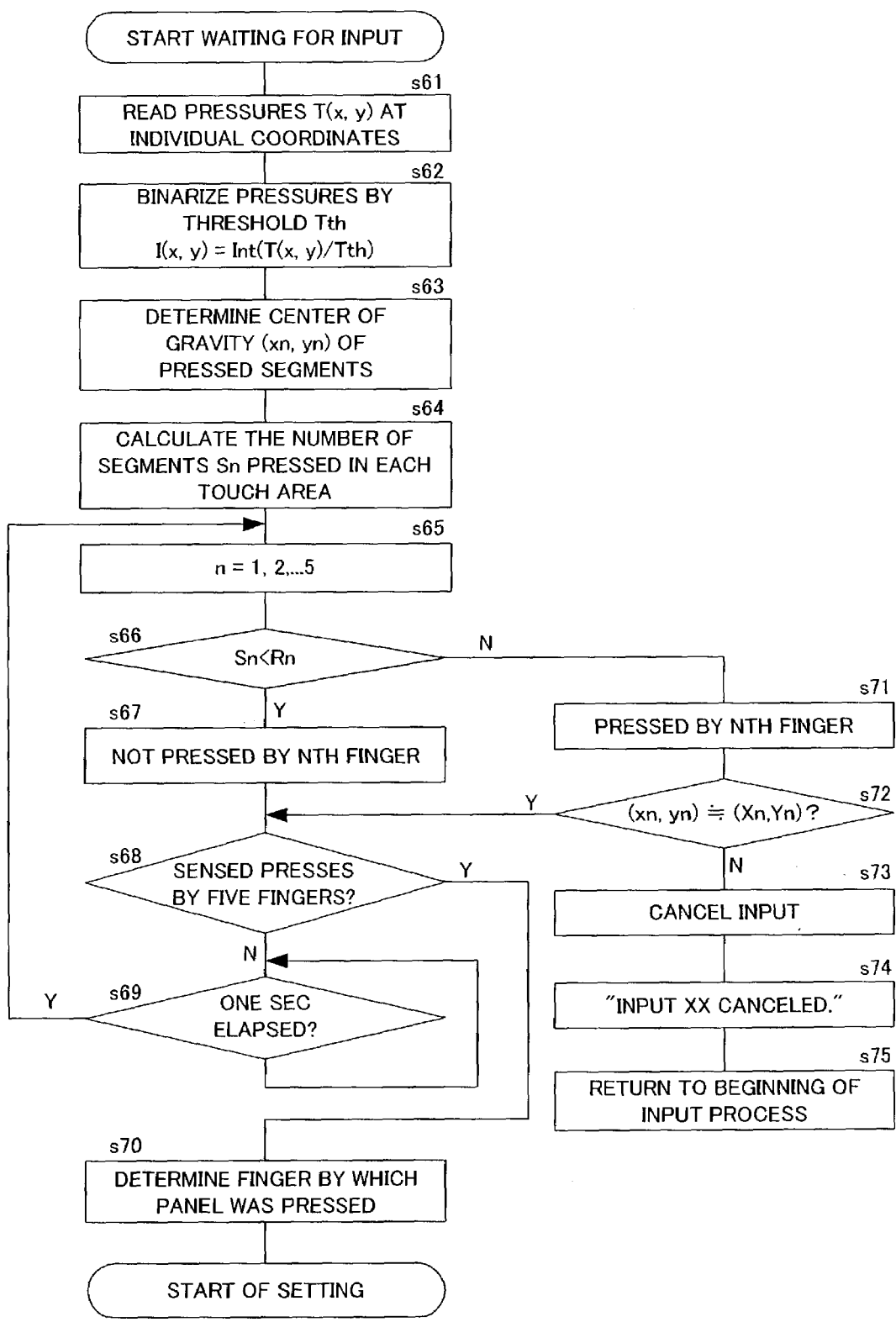
FIG. 9 is a flowchart showing a method of recognizing presses on the touch areas registered on the touch panel.

Next, a method of recognizing a press in each of the touch areas 3a–3e thus registered is explained with reference to a flowchart of FIG. 9.

First, the user presses a touch area by the nth finger. If the user presses the touch panel 3 by the 1st finger (thumb), for example, the controller 4 reads in data on pressures T(x, y) applied at individual coordinates (x, y) of all the segments of the touch panel 3 in step S61 to determine where the pressure has been applied. In step S62, the controller 4 binarizes the individual pressure data T(x, y) by using the equation I(x, y)=Int(T(x, y)/Tth) to divide the individual segments into segments where the pressure has been applied and segments where no pressure has been applied.

Then, in essentially the same fashion as explained with reference to FIG. 5, the controller 4 calculates coordinates (xn, yn) of the segment located at the center of gravity of the segments pressed by the nth finger in step S63. In step S64, the controller 4 calculates the number of segments where the pressure has been applied, i.e., D(x, y)=1. Here, the number of segments where the pressure has been applied by the nth finger is expressed by Sn.

The value Sn thus calculated for each of the touch areas 3a–3e is compared with the value Rn which was calculated when registering the individual touch areas 3a–3e (steps S65, S66). Since the 1st finger (thumb) applies a large pressure to the touch area 3a, the number of segments S1 where the pressure is applied is equal to or larger than the value R1 calculated when registering the touch area 3a (S1=R1). Thus, if the relationship S1<R1 is not satisfied in step S66, the controller 4 recognizes in step S71 that the touch area 3a is pressed by the 1st finger (thumb).

If the coordinates (x1, y1) of the center of gravity approximately match the coordinates (X1, Y1) of the center of gravity previously calculated when registering the touch area 3a in step S72, the controller 4 proceeds to step S68. Since the controller 4 has not sensed presses on all of the five touch areas 3a–3e at this point, the controller 4 returns to step S65 and begins to sense a press by the 2nd finger (index finger) after one second has elapsed in step S69.

Since no pressure is applied to the touch area 3b for the 2nd finger (index finger) in the present example, the value S2 is almost equal to zero and, therefore, S2<R2. In this case, the controller 4 recognizes in step S67 that the touch panel 3 has not been pressed by the 2nd finger (index finger). Since the controller 4 has not sensed presses on all of the five touch areas 3a–3e yet (step S68), the controller 4 returns to step S65 again and begins to sense a press by the 3rd finger (middle finger) after one second has elapsed in step S69. When the controller 4 has sensed presses on the five touch areas 3a–3e by the 1st to 5th fingers by repeating the aforementioned sequence, the controller 4 proceeds from step S68 to step S70 and determines by which finger the touch panel 3 has been pressed.

If the position of the press by the 1st finger (thumb) is offset from the registered position, Sn>Rn in step S66, so that the controller 4 proceeds to step S71, in which the controller 4 recognizes that the touch panel 3 has been pressed by the 1st finger (thumb). Then, in step S72, the controller 4 judges that the coordinates (x1, y1) of the center of gravity do not match or approximately match the coordinates (X1, Y1) of the center of gravity previously calculated when registering the touch area 3a. In this case, the controller 4 cancels the input by the 1st finger (thumb) in step S73, annunciates the message "Input XX canceled" in step S74, and returns to a state of waiting for an input in step S75.

If the press by the 1st finger (thumb) was insufficient, S1<R1 in step S66, so that the controller 4 judges that the touch panel 3 was not pressed by the 1st finger (thumb). In this case, it is necessary for the user to cancel the input by himself (or herself) and press the touch panel 3 again.

Next, the number of copies judgment process (step S32 of FIG. 4) which enables the user to specify the number of copies is described below in detail.

The number of copies entered by the user can range from 1 to some tens. To enable entry of the number of copies falling in this range, five keys (touch areas 3a–3e) are used in combination. As an example, the controller 4 is preprogrammed to regard a single press by the index finger as N=1, a simultaneous press by the index finger and the middle finger as N=2, a simultaneous press by the index finger, the middle finger and the third finger as N=3, a simultaneous press by the index finger, the middle finger, the third finger and the little finger as N=4. With the controller 4 thus preprogrammed, N=5 to 9 can be entered by adding the values N=1 to 4.

The value of the tens' place is entered by a combination of the thumb and one or more of the other fingers. Specifically, a simultaneous press by the thumb and the index finger designates N=10, a simultaneous press by the thumb, the index finger and the middle finger designates N=20, a simultaneous press by the thumb, the index finger, the middle finger and the third finger designates N=30, and a simultaneous press by the thumb, the index finger, the middle finger, the third finger and the little finger designates N=40.

The user can easily enter the number of copies ranging from 1 to some tens by pressing the five touch areas 3a–3e in the aforementioned fashion. Although it is normally so difficult to press the touch panel 3 with the third finger (ring finger) alone, the user can easily press the touch panel 3 by using the third finger simultaneously with one or more of the other fingers.

As thus far described, it is possible to register regions pressed by the fingertips and their surrounding regions as the touch areas when the user places the hand on the touch panel 3 of the input device 1 of the foregoing embodiment. Therefore, the user can register the touch areas without moving the hand or fingers to desired locations of the individual touch areas.

Accordingly, even when a person confined to a wheelchair operates the touch panel 3 from a low position or when a weak-sighted person having difficulty in visually recognizing the touch areas on the touch panel 3 operates it, it is possible to register the touch areas at convenient locations by simply pressing the touch panel 3 at first. Furthermore, even a person having difficulty in moving the fingers can easily perform input operations.

If one should perform input operations without moving the hand at all, it would normally be necessary to indicate various operating instructions for all the touch areas to be pressed by the five fingers to enable the user to perform all operations. According to the aforementioned input method of the present embodiment, however, the result of each input operation is determined by the number of presses on the same touch area, so that the user can perform various input operations by performing the same action.

Since the result of each input operation is also determined by the combination of touch areas, the user can perform various input operations by simultaneously pressing appropriate ones of the five touch areas. Furthermore, the user can perform a different kind of input operation (cancellation) by sliding a finger while holding it pressed against the touch panel 3, because the controller 4 receives information differing from ordinary press information entered by presses on the touch area from this sliding action. Moreover, the user can quickly perform each input operation by a small number of operational steps, because input data is validated after a lapse of one second from the completion of data input or by a touch by all the fingers, enabling the user to immediately perform a subsequent input operation.

It is appreciated from the foregoing discussion that the invention offers the following advantageous effects.

The user registers individual touch areas before performing input operations. To register the touch areas, the user places the hand at a desired position on the touch panel 3 and presses it with all the fingers, for example. As a result, the controller 4 registers regions of the touch panel 3 pressed by the individual fingertips and their surrounding regions as the touch areas.

Since the touch areas are generated at locations convenient for the specific user in this fashion, the input device 1 of the invention enables the user to press the touch areas without moving the hand or fingers to the locations of the individual touch areas unlike the conventional touch panel.

This enables the user to operate the touch panel 3 without seeing its touch area arrangement. Accordingly, even a person confined to a wheelchair who can not see the touch panel 3 and has to operate it from a low position or a weak-sighted person who can not visually recognize the touch areas can easily press the touch areas on the touch panel 3. In addition, even a person having difficulty in moving the hand can easily operate the touch panel 3 as it is not necessary to move the hand.

When the controller 4 receives particular press information, it switches the kind of data to be entered by pressing the touch areas on the touch panel 3. If the main apparatus 5 is a copying machine having a facsimile function, for instance, the controller 4 switches the input device 1, upon receiving such particular press information, to accept user settings and commands for switching between copying mode and facsimile transmission mode, selecting the paper size, specifying the number of copies, starting a copying operation, canceling input data, and so on.

The controller 4 switches the kind of data to be entered by pressing the touch areas each time such particular press information is received. A special form of touch area pressing, such as a press by all the fingers, may be used to enter this particular press information at any stage of operation. If certain data is already input but not validated yet, or no data is input yet, the controller 4 enters default settings without any change to the main apparatus 5 upon receiving such particular press information. With this arrangement, the input device 1 can securely transmit information presently needed by the user to the main apparatus 5.

The controller 4 may be so programmed to switch the kind of data to be entered by pressing the touch panel 3 if no press information is received for one second. This arrangement enables the user to input data with reduced workload.

Since the controller 4 audibly annunciates switching of the kind of input data, it enables a person who can not visually recognize indications on the display screen to operate the touch panel 3, thereby achieving an improvement in operational ease.

The controller 4 determines the value of input data from the number of successive presses on the same touch area. For example, the controller 4 counts the number of successive presses on a particular touch area and enters one of options selected in accordance with the counted number of presses to the main apparatus 5.

In this form of a data input method, it is necessary for the user to press the touch area a larger number of times as the number of options increases. It is therefore desirable that the user can select a desired option from a relatively small number of options. To permit simple and easy-to-understand data input operation with a small number of presses on the touch areas, such options may include, for example, selection of an operation mode from the copying mode and facsimile transmission mode as well as selection of the paper size.

The controller 4 determines the value of input data according to the combination of touch areas. For example, the controller 4 may be preprogrammed in such a manner that a single press by the index finger enters the value "1", a simultaneous press by the index finger and the middle finger enters the value "2", a simultaneous press by the index finger, the middle finger and the third finger enters the value "3", and a simultaneous press by the index finger, the middle finger, the third finger and the little finger enters the value "4" when the user specifies the number of copies in the copying mode. With this arrangement, the user can enter various kinds of data with a small number of keystrokes on a small number of touch areas by using different combinations of touch areas.

The controller 4 counts the number of successive presses on a particular touch area and enters information obtained by adding data represented by the number of presses to existing data to the main apparatus 5. If the controller 4 receives press information representing the value "10" twice and press information representing the value "4" once in succession in a process of entering a numeric value, for example, the controller 4 enters the value "24" to the main apparatus 5. With this arrangement, the user can simply enter various kinds of information with a small number of keystrokes on a small number of touch areas.

When the user slides a finger while holding it pressed against the touch panel 3, the controller 4 recognizes information entered by this sliding action as being different from ordinary press information entered by presses on the touch area and enters different data to the main apparatus 5. According to this feature of the invention, the user can enter various kinds of information without vertically moving any finger. In addition, if the touch panel 3 has the ability to distinguish between horizontal and vertical sliding actions, the user can enter more different kinds of information by just sliding the finger along the touch panel 3.

Before performing input operations, the user places the hand on the touch panel 3 and presses it with all the fingers, for example, to register regions of the touch panel 3 pressed by the individual fingertips and their surrounding regions as the touch areas. Since the touch areas are generated at locations convenient for the specific user in this fashion, the input device 1 of the invention enables the user to press the touch areas without moving the hand or fingers to the locations of the individual touch areas unlike the conventional touch panel.

This enables the user to operate the touch panel 3 without seeing its touch area arrangement. Accordingly, even a person confined to a wheelchair who can not see the touch panel 3 and has to operate it from a low position or a weak-sighted person who can not visually recognize the touch areas can easily press the touch areas on the touch panel 3. In addition, even a person having difficulty in moving the hand can easily operate the touch panel 3 as it is not necessary to move the hand.

What is claimed is:

1. An input device comprising:
   a touch panel which recognizes a press on a touch area and outputs press information; and
   a controller which receives the press information output from said touch panel and transmits corresponding data to a main apparatus;
   wherein said controller registers a pressed region of said touch panel and regions that are formed immediately outside the pressed region with reference to a center of gravity of the pressed region as the touch area in a touch area registration process performed prior to execution of data input operation.

2. The input device according to claim 1, wherein said controller switches the kind of data to be input by pressing the touch area upon receiving particular press information.

3. The input device according to claim 1, wherein said controller switches the kind of data to be input by pressing the touch area if no press information is received within a specific period of time.

4. The input device according to claim 2, wherein said input device audibly annunciates switching of the kind of input data.

5. The input device according to claim 1, wherein said controller determines the value of input data from the number of successive presses on the touch area.

6. The input device according to claim 1, wherein more than one touch area is registered and said controller determines the value of input data according to a combination of touch areas from which press information has been received.

7. The input device according to claim 1, wherein said controller determines the value of input data by adding data corresponding to the number of successive presses on the touch area to existing data.

8. The input device according to claim 1, wherein said touch panel recognizes a sliding action along the touch area and transmits corresponding information to said controller, and said controller transmits corresponding data to said main apparatus.

9. A touch area registration method comprising the steps of:
   receiving press information output from a touch panel;
   transmitting data corresponding to the received press information; and
   registering a pressed region of the touch panel and regions that are formed immediately outside the pressed region with reference to a center of gravity of the pressed region as the touch area prior to execution of data input operation.

* * * * *